Oct. 25, 1932.     A. HAUGE     1,884,671
LOADING MACHINE
Filed Dec. 31, 1929     2 Sheets-Sheet 1
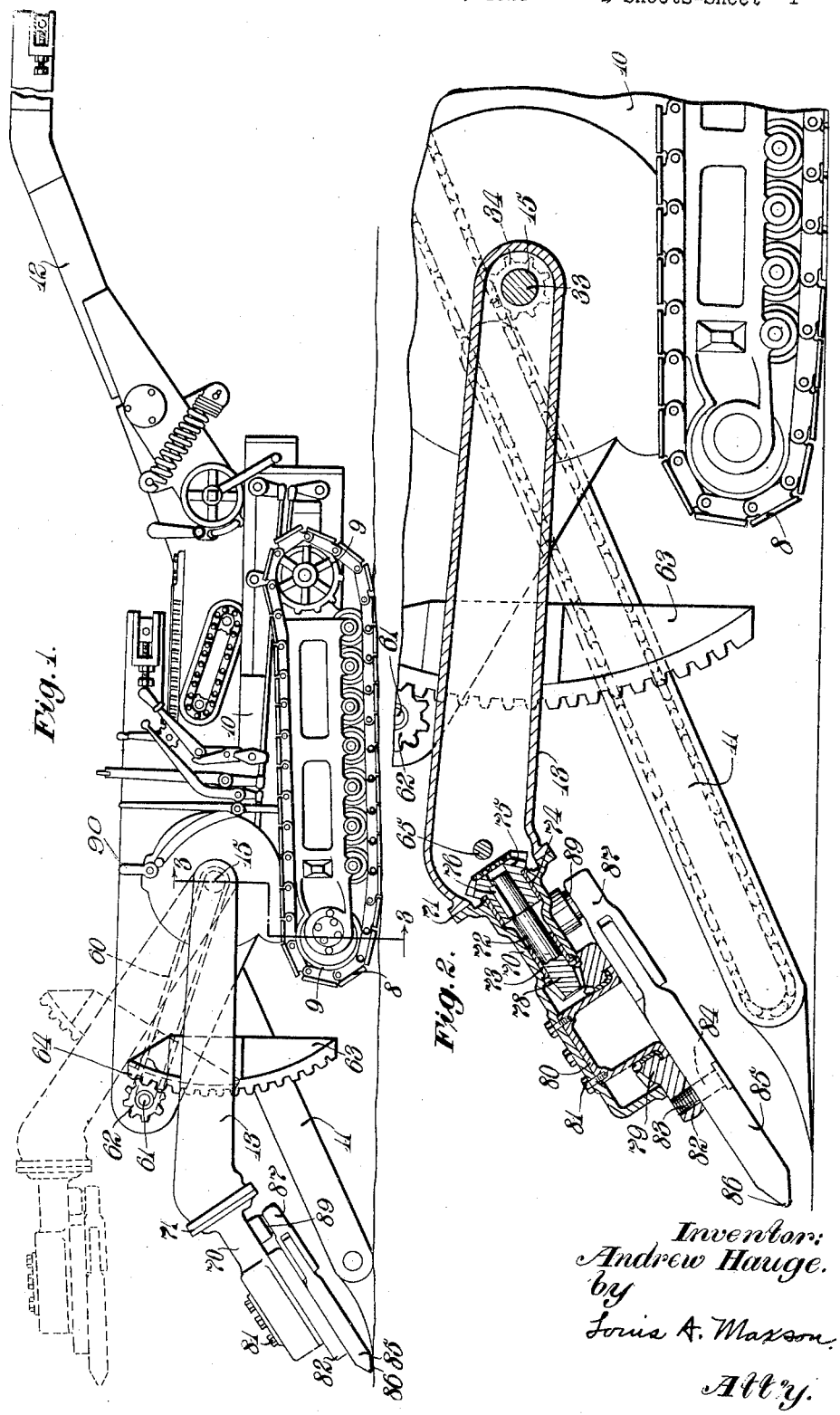

Oct. 25, 1932.  A. HAUGE  1,884,671
LOADING MACHINE
Filed Dec. 31, 1929  2 Sheets-Sheet 2
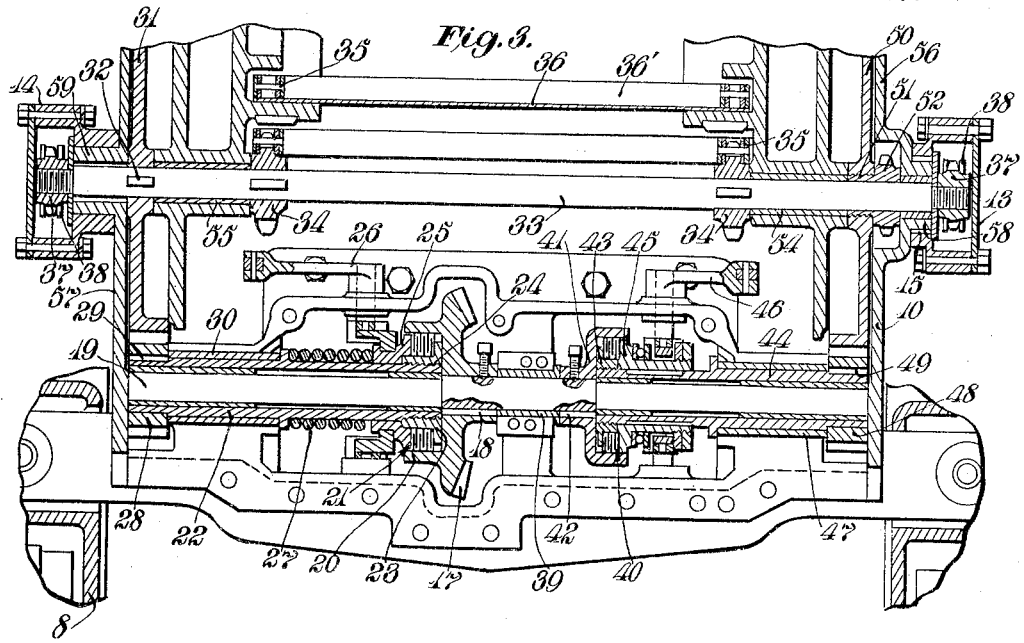
Inventor:
Andrew Hauge.
by
Louis A. Maxson
Att'y.

Patented Oct. 25, 1932

1,884,671

UNITED STATES PATENT OFFICE

ANDREW HAUGE, OF MICHIGAN CITY, INDIANA, ASSIGNOR TO SULLIVAN MACHINERY COMPANY, A CORPORATION OF MASSACHUSETTS

LOADING MACHINE

Application filed December 31, 1929. Serial No. 417,625.

This invention relates to an improved loading machine for gathering loose material and conveying and elevating the material so as to deliver it into a mine car or other desired location. More particularly, my invention relates to improved means for gathering material so that the same may be transported by conveying means to a desired point of delivery.

One object of my invention is to provide improved loading mechanism for gathering loose material and carrying the same rearwardly so as to deliver it to some desired location such as mine cars. A further object of my invention is to provide improved gathering mechanism which may be used in combination with the conveying mechanism of a loading machine. A still further object of my invention is to provide improved means for digging into material on both sides of a gathering conveyor and moving the material inwardly and rearwardly onto the gathering conveyor, this digging means being mounted on a support which may be swung up and down. Further objects of my invention will appear in the course of the ensuing description and be pointed out in the accompanying claims.

For purposes of illustration, one embodiment of my invention is disclosed in the accompanying drawings, in which:

Fig. 1 is a view in side elevation of a loading machine which includes as a part thereof the illustrative embodiment of my improved gathering mechanism. In Fig. 1 the gathering mechanism is shown in broken lines in a more elevated position in which the mechanism may dig into material to loosen the same.

Fig. 2 is a side elevation of the front portion of the machine, with parts broken away to facilitate illustration of the mechanism, the actuating means for the gathering mechanism being shown in section.

Fig. 3 is a vertical transverse section on line 3—3 of Fig. 1.

Fig. 4 is a plan view of the forward portion of the loading mechanism, one of the arms and the actuating means for a gathering device being shown in section to facilitate illustration of the same.

The type of loading machine with which my gathering mechanism cooperates may be varied. For purposes of illustration, however, I have shown a loading machine which is mounted on track laying tread mechanisms 8 driven by sprockets 9. The main frame 10 of the machine supports a gathering conveyor 11 and a tail or delivery conveyor 12. My improved gathering mechanism is supported on a pair of arms 13 and 14, vertically tiltable about a common axis 15.

The driving motor (not shown) has its drive shaft arranged longitudinally of the main frame 10. A bevel pinion on the front end of this drive shaft meshes with and drives a bevel pinion 17. This bevel pinion 17 is keyed at 18 to a transverse shaft 19, with which cooperate two different clutch mechanisms. A hub 20 formed on the bevel gear 17 forms one member of a clutch mechanism 21. A sleeve 22 carries the other member 23 of the clutch mechanism 21, the member 23 being threadedly connected at 24 to the sleeve 22. Both clutch mechanisms are of the interleaved disc type. A shipper member 25 is rotatably mounted on the sleeve 22, being operated by clutch shifting mechanism 26. A spring 27 normally presses the member 25 into engagement with the discs to load the clutch mechanism 21. A spur gear 28 is keyed at 29 to the sleeve 22. A bearing 30 is provided in the main frame 10 of the loading machine for rotatably supporting the sleeve 22. A spur gear 31 is keyed at 32 to a transverse shaft 33 which carries sprockets 34 for driving the chains 35 of the gathering conveyor, the sprockets 34 being engaged with only the lower runs of the chains 35. A plate 36 is provided, over which the bars 36' of the gathering conveyor move to drag the material upwardly and rearwardly. Sprockets 37 are secured to the outer ends of the shaft 33, and chains 38 are driven thereby for actuating the gathering mechanism supported by the arms 13 and 14. These chains 38 are contained within the arms 13 and 14, which are made hollow.

A second clutch mechanism 40 surrounds the shaft 19 to the right of a central bearing 39, which is provided in the main frame 10 for said shaft 19. The clutch mechanism 40 comprises a member 41 keyed at 42 to the shaft 19. The driven member 43 of the clutch is secured in threaded engagement with a sleeve 44, which is rotatably mounted on and surrounds the shaft 19. A shipper member 45 is journaled on the sleeve 44 and is slidable longitudinally of the same to exert pressure on the discs, so as to cause clutching of the member 43 with the member 41. Clutch actuating mechanism 46 is provided for actuating the shipper member 45. The sleeve 44 is supported in a bearing 47 in the main frame 10 of the loading machine. A pinion 48 is keyed at 49 to the sleeve 44. A spur gear 50 is threadedly connected to a hub member 51, which is journaled on the shaft 33. The spur gear 50 meshes with the pinion 48 and when driven thereby is adapted to rotate a sprocket 52 which is formed integral with the hub member 51. Side members of the main frame 10 provide bearings at 54 and 55 respectively for the shaft 33. The side plates 56 and 57 supported by the main frame 10 provide hubs 58 and 59 respectively, on which are mounted for tilting movement upward and downward the arms 13 and 14 respectively. Mechanism, which may be driven by the sprocket 52, has been provided for simultaneously tilting the arms 13 and 14 upward and downward. A chain 60 extends forward from the sprocket 52 and drives a sprocket (not shown) which is secured to a shaft 61 disposed transversely with respect to the main frame 10 and supported by the side members thereof. A pair of pinions 62 secured to shaft 61 mesh with a pair of arcuate racks 63, one of which is fixedly secured to the arm 13, and the other of which is fixedly secured to the arm 14. A large tooth 64 is provided at the upper end of each rack so as to prevent its cooperating pinion 62 running out of mesh. This prevents the arms dropping down, should there be a depression in the floor of the mine. It is clear that if the clutch actuating mechanism 46 be suitably moved by the operator, the spur gear 50 will be driven, and chain 60 will rotate shaft 61 so as to move the arcuate racks 63 upward, thereby simultaneously elevating the arms 13 and 14.

Since the gathering means on the two sides of the gathering conveyor 11 are substantially identical, it is necessary to describe only one of the same. As shown in Fig. 4, a stub shaft 65 is mounted in bearings in the forward portion of the arm 14. A bevel gear 66 is keyed at 67 to an extended hub of a sprocket 68, which is keyed at 69 to the stub shaft 65. The chain 38 is directed about the sprocket 68 for driving the same. A casing member 70 is secured in any suitable fashion at 71 to the forward end of arm 14. A shaft 72, disposed at a slight angle inwardly with respect to the arm 14, is mounted in spaced bearings 73 and 74 provided in the frame 70. A bevel gear 75 is keyed at 76 to the shaft 72, and meshes with bevel gear 66. The forward end of shaft 72 carries a small bevel pinion 78. In this illustrative embodiment, this pinion is formed integral with shaft 72. An annular member 79 surrounds and is journaled on a cylindrical member 80 secured by screws 81 to the frame member 70. Gear teeth, adapted to mesh with the bevel pinion 78, are formed upon the upper portion of the annular member 79. It is apparent, therefore, that when the clutch shifting mechanism 26 is suitably operated to load the clutch mechanism 21, the shaft 33 will be driven through gears 28 and 31; and the shafts 72 of the respective actuating mechanisms for the gathering means will be rotated so as to drive the annular members 79 thereof.

The annular member 79 is formed with a lateral lug 82 which carries a stud 83, the latter being threaded into the said lug. The stud 83 is provided with a bearing portion 84 engaging a bearing in a digging and gathering element 85. The front end of the element 85 is pick-shaped, as at 86, and slightly curved inwardly to facilitate digging into the material, and also to aid in drawing the material toward the conveyor 11. The rear end of the element 85 is pivoted at 86a to a link 87, which is pivoted to swing about an axis 88. The link 87 is supported by the arm 14 through a stub shaft 89 arranged on the axis 88, and the link 87 is pivoted to this shaft.

The operation of my improved mechanism for gathering material is as follows: The sprockets 9 are actuated to drive the treads 8 so as to steer the loading machine and propel the same up to the material which is to be loaded. The clutch mechanism 40 is suitably actuated to bring the arms 13 and 14 to the proper elevation. A latch mechanism 90 which cooperates with the spur gear 50 may be thrown into engagement to hold the arms 13 and 14 at such elevation. Should the coal or other material be in loose condition upon the ground, the arms may be positioned as shown in full lines in Fig. 1. If it is desired to dislodge coal which is wedged between the floor and roof of the mine, the arms 13 and 14 may be elevated to the position shown in broken lines in Fig. 1. The clutch mechanism 21 is then suitably actuated to drive the conveyor 11 and at the same time to actuate the gathering mechanism. It may also be desirable to actuate the sprockets 9 to move the loading machine slowly forward during the time that the conveyor 11 and the gathering mechanism are being driven.

The elements 85 are moved by the studs 83 in an orbital path, the pick-like points 86 being guided by the links 87. Each link 87 is pivotally connected to an element 85 at one end and pivoted to a shaft 89 at the other end. As the annular member 79 rotates, the stud 83 is carried with it in a circular path; and the pick-like points 86 move in a non-circular orbit so as to sweep the material onto the conveyor 11. As the stud 83 supported by arm 13 passes the position shown in Fig. 4, the link 87 causes the point 86 to start to move away from the material which has been shoved onto the conveyor 11. The said gathering element 85 now swings across beneath the frame 70 and the annular member 79, and the point 86 is forced into the material and then again swept towards the gathering conveyor 11. The respective pinions 78 of the actuating mechanisms for the gathering means carried by the arms 13 and 14 are so assembled with the respective annular members 79 as to cause alternate inward sweeping movements by the respective elements 85 carried by the two arms. In other words, first the element 85 carried by the arm 13 will move material onto the conveyor 11; and then, as this element is withdrawn and moves on in its orbit, the other element 85 acts to gather material onto the conveyor 11. The arms 13 and 14 may be moved to various elevations (see Fig. 1) so as to engage material on the ground, or in piles of different dimensions, or in a mine to dislodge standing coal, etc. The material is swept or gathered onto the conveyor 11, and then carried rearwardly by the conveying mechanism and deposited at the desired point of delivery.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a loading machine, a portable base, conveying means thereon, and material gathering means associated with said conveying means for moving the material to be loaded thereon and including a swingable arm structure pivotally mounted on said base, material gathering elements carried beneath the outer extremity of said arm structure and overlying and movable laterally in substantially the plane of the conveying means, and means for swinging said arm structure to vary the elevation of said gathering elements relative to said conveying means.

2. In a loading machine, a portable base, conveying means thereon, and material gathering means associated with said conveying means for moving the material to be loaded thereon and including a swingable arm structure pivotally mounted on said base, material gathering elements carried beneath the outer extremity of said arm structure and overlying and movable in substantially the plane of the conveying means, means for actuating said gathering elements including rotatable discs to which the gathering elements are pivotally connected, a link pivotally connected to each gathering element and pivotally mounted on said arm structure, and means for swinging said arm structure to vary the elevation of said gathering elements relative to said conveying means.

In testimony whereof I affix my signature.

ANDREW HAUGE.